United States Patent
Homewood et al.

(10) Patent No.: US 10,850,249 B2
(45) Date of Patent: Dec. 1, 2020

(54) SEAL ASSEMBLY FOR CREATING A SEALED FLOW PATH BETWEEN FIRST AND SECOND FLUID DUCTS

(71) Applicant: Blacktrace Holdings Limited, Royston (GB)

(72) Inventors: Philip Homewood, Enfield (GB); Hannah Kenyon, Cambridge (GB)

(73) Assignee: BLACKTRACE HOLDINGS LIMITED, Royston (GB)

( * ) Notice: Subject to any disclaimer, the term of this patent is extended or adjusted under 35 U.S.C. 154(b) by 393 days.

(21) Appl. No.: 15/842,572

(22) Filed: Dec. 14, 2017

(65) Prior Publication Data
US 2018/0169604 A1 Jun. 21, 2018

(30) Foreign Application Priority Data
Dec. 16, 2016 (GB) .................. 1621497.5

(51) Int. Cl.
*B01J 19/00* (2006.01)
*F16J 15/02* (2006.01)
(Continued)

(52) U.S. Cl.
CPC ............. *B01J 19/0073* (2013.01); *B01J 3/03* (2013.01); *B01J 12/007* (2013.01);
(Continued)

(58) Field of Classification Search
CPC ...... B01J 19/0073; B01J 3/03; B01J 19/2415; B01J 12/007; F16L 51/00; F16J 15/028; F16J 15/3452
See application file for complete search history.

(56) References Cited

U.S. PATENT DOCUMENTS

| 1,159,764 A | 11/1915 | Heller |
| 1,354,296 A | 9/1920 | Hatfield |

(Continued)

FOREIGN PATENT DOCUMENTS

| DE | 812 918 | 9/1951 |
| EP | 0 330 622 A1 | 8/1989 |

(Continued)

OTHER PUBLICATIONS

Communication with European Search Report, EP Application No. 17207137.5, dated May 7, 2018, 6 pp.
(Continued)

*Primary Examiner* — James M Hewitt, II
(74) *Attorney, Agent, or Firm* — Myers Bigel, P.A.

(57) ABSTRACT

A sealing assembly creating a sealed flow path between fluid ducts. The seal assembly comprises a housing and a tubular element within the housing providing a fluid conduit between the fluid ducts. Two sealing elements each have an internal sealing face sealably engaged with the tube and an external face for sealing, in use, with a respective fluid duct. At least one of the sealing elements is slidable with respect to the tubes. A support is slidably retained by the housing, surrounds one end of the tube and supports one of the slidable sealing elements on the side of the sealing element opposite to its external face. A resilient element within the housing biases the support so as to urge the two sealing elements apart.

13 Claims, 5 Drawing Sheets

(51) Int. Cl.
*B01J 3/03* (2006.01)
*F16L 51/00* (2006.01)
*B01J 12/00* (2006.01)
*B01J 19/24* (2006.01)
*F16J 15/34* (2006.01)

(52) U.S. Cl.
CPC ......... *B01J 19/2415* (2013.01); *F16J 15/028* (2013.01); *F16J 15/3452* (2013.01); *F16L 51/00* (2013.01); *B01J 2219/00063* (2013.01); *B01J 2219/1943* (2013.01); *F16C 2208/32* (2013.01)

(56) References Cited

U.S. PATENT DOCUMENTS

| | | | |
|---|---|---|---|
| 3,976,129 | A | 8/1976 | Silver |
| 4,039,232 | A | 8/1977 | Vinciguerra |
| 4,101,287 | A | 7/1978 | Sweed et al. |
| 4,123,092 | A * | 10/1978 | Colbert, Jr. ............. F16L 51/00 285/187 |
| 4,822,570 | A * | 4/1989 | Lerman ................ B01J 19/0066 137/457 |
| 5,027,855 | A | 7/1991 | Jaggi |
| 8,592,220 | B2 | 11/2013 | Bergh et al. |
| 2003/0194352 | A1 * | 10/2003 | Lautenschlager .......... B01J 3/03 422/400 |
| 2012/0157719 | A1 | 6/2012 | Teles et al. |
| 2015/0061229 | A1 * | 3/2015 | Ryther .................... F16J 15/348 277/375 |
| 2017/0165632 | A1 | 6/2017 | Homewood et al. |
| 2017/0292611 | A1 * | 10/2017 | Tanju .................... F16J 15/346 |

FOREIGN PATENT DOCUMENTS

| | | |
|---|---|---|
| EP | 2 671 636 A1 | 12/2013 |
| EP | 1 965 900 B1 | 12/2014 |
| FR | 1403792 | 5/1965 |
| GB | 1004587 | 9/1965 |
| GB | 1 249 585 | 10/1971 |
| WO | WO 2004/073861 A2 | 9/2004 |
| WO | WO 2004/073861 A3 | 9/2004 |
| WO | WO 2010/104807 A1 | 9/2010 |
| WO | WO 2015/033266 A1 | 3/2015 |

OTHER PUBLICATIONS

Patents Act 1977: Search Report under Section 17(5), UKIPO Application No. GB1621497.5, dated Jun. 21, 2017, 3 pp.
Patents Act 1977: Search Report under Section 17, UKIPO Application No. GB1521670.8, dated Nov. 11, 2016, 2 pp.

* cited by examiner

SEAL ASSEMBLY FOR CREATING A SEALED FLOW PATH BETWEEN FIRST AND SECOND FLUID DUCTS

RELATED APPLICATION

This application claims priority from Great Britain Patent Application No. 1621497.5, filed on Dec. 16, 2016, the disclosure of which is hereby incorporated herein by reference in its entirety.

FIELD OF THE INVENTION

The present invention relates to a seal assembly for creating a sealed flow path between first and second fluid ducts.

BACKGROUND

Typically, large scale chemical reactions are carried out as batch processes using stirred tank reactors where reactants are mixed by a rotary stirrer and the temperature is controlled by an outer jacket with a circulating thermal fluid.

An alternative to such a reactor is disclosed in our own earlier GB 1521670.8 and is shown in FIG. 1.

This reactor device 100 is formed of a generally cylindrical reaction vessel 102 which is closed by a top end cap 104 and bottom end cap 106. Temperature controlling fluid is circulated through the cylinder 102 as depicted by arrows 108, 110. A helically coiled tube 112 which is typically made of glass extends in the two end caps 104, 106 to convey reaction fluid through the device 100.

As shown in FIG. 1, a manifold block 114 is provided in the top of the end cap 104. The manifold block 114 has a through flow passage 116 sealed at the bottom end, to the tube 112 by a polytetrafluoroethylene (PTFE) ring seal 118. The top end of the flow path 116 is provided with a sprung seal 120 via which the manifold block 114 is connected to a supply of pre-mixed reaction fluid. This sprung seal 120 must be able to accommodate any movement which occurs when the manifold block 114 heats up.

GB 1521670.8 also discloses examples where the reactor is made up of a number of modules, each being similar to the device described in FIG. 1. Such a reactor is shown in FIG. 2 where the module has a modified top cap 104' containing a modified manifold 114'. The upper reactor has a modified bottom cap 106' and a modified top cap 104". The two are connected together by the flange clamp 122. In this case, the modified manifold 114' has two manifold ducts 116' and there are correspondingly two sprung seals 120.

In this case, where the modules are tightly clamped together, it is even more important that the sprung seal is able to take up any thermal expansion which could occur. During the design process we did consider clamping the reaction modules together using sprung clamps to take up the thermal expansion and using a more rigid seal. However, any external side loads on the reaction modules could force the sprung clamp to open up. This would be a particular problem in the case where the reaction modules were mounted horizontally and not supported evenly.

SUMMARY

The present invention is directed to an improved design for a sprung seal which is able to accommodate thermal expansion.

While the present invention has been motivated by a desire to provide an improved seal assembly for the above-mentioned type of reactor, it can be applied in any situation where it is necessary to create a seal between first and second flow ducts, particularly where there is a need to accommodate thermal expansion.

According to the present invention there is provided a seal assembly according to claim 1.

The provision of the two sealing elements which are biased away from one another by a resilient element and which seals with and can slide with respect to the tube provides a robust arrangement which is readily able to accommodate thermal expansion. The use of the resilient element and the slidable sealing element allows the sealing elements to be compressed between the first and second ducts thereby providing a degree of pre-compression to the seals to provide a high pressure sealing arrangement.

The resilient element may bear against the housing itself at the second end of the housing. However, preferably, there is further provided a second plate surrounding the opposite end of the tube and supporting the other sealing element on the side opposite to the external face of the sealing element, the resilient element being arranged to bias the first and second support apart. This separates the biasing arrangement from the housing itself to provide a more robust design as movement from either end compress the spring without also moving the housing.

The sealing element can be a simple O-ring. Such a seal is perfectly adequate for a relatively low range of temperatures. However, preferably, each sealing element has a more complex shape configured such that as much of the perimeter of the seal as possible is constrained by an external surface. Preferably each sealing element is configured such that when, in use, its external face is sealed against the respective fluid ducts, at least 60%, preferably at least 65% and more preferably at least 70% of the perimeter of the seal is constrained directly by the fluid duct, housing, support and tube.

This high degree of constraint of the perimeter of the sealing element reduces the possibility for creep of the material of the sealing element even at high temperatures. Because the seal is used in a sealing assembly which is designed to thermally expand, its perimeter cannot be fully constrained. However, because only a relatively small proportion of the perimeter is unconstrained, this small amount of creep which may occur in the unconstrained regions is within acceptable limits.

Each of the sealing elements forms a seal between the tube and the respective external face. Relatively soft materials can readily do this as they are easily able to deform. However, for a relatively hard material such as perfluoroalkoxy (PFA), fluorinated ethylene propylene (FEP), modified PTFE or polyether ether ketone (PEEK), the sealing element may be shaped in a manner to enhance the seal. Preferably, in cross-section, the angle of interface between the seal and the support with respect to the axis of the tubular element is between 30° and 60°.

Elastomer materials such as fluoroelastomer (FKM) and perfluorelastomer (FFKM) are commonly used for sealing. Elastomers are typically much softer materials with a Young's Modulus which is <0.1 GPa and typically <0.01 GPa. Elastomers suffer from two problems, at low temperatures <−15° C. they become brittle and which compromises their ability to seal and at high temperatures >100° C. they can become significantly softer which results in extrusion of seals when pressure is applied.

Preferably, the sealing element has a Young's Modulus which is greater than 0.1 GPa and typically in the range 0.2-20 GPa. Preferred materials include thermoplastics, for example PFA, FEP, modified PTFE and PEEK. These materials have good operating temperature ranges remaining flexible at low temperatures, for example −50° C. and below and typically operate with, minimum creep up to 200° C. for PTFE and up to 260° C. with modified PTFE.

The tubular element may be of any material with the necessary strength and rigidity to stand the temperature and pressure variations. The ideal material for the tubular elements is glass.

The resilient element may be any resilient element capable of providing the necessary force. However, the resilient element is preferably a single compression spring. This is able to generate a high force in the space available around the tubular element.

The external face of a first and/or second sealing element may be flat as it is intended to engage with a surface that is, itself, generally flat. However, preferably, the external face of one or more of the sealing elements has a raised annular portion. This raised annular portion is more easy to deform when the seal is compressed such that the deformed material is more readily able to deform into any surface imperfections such as scratches in the first and second fluid ducts.

The present invention also extends to equipment for continuous chemical flow processes, the equipment comprising first and second fluid ducts sealed by a sealing assembly according to a first aspect of the present invention. This equipment may be a flow reactor, crystallisation-in-flow equipment, flow filtration equipment or flow liquid-liquid extraction equipment.

BRIEF DESCRIPTION OF THE DRAWINGS

An example of a seal assembly and flow reactor in accordance with the present invention will now be described with reference to the accompanying drawings, in which.

DETAILED DESCRIPTION

Figure 1:
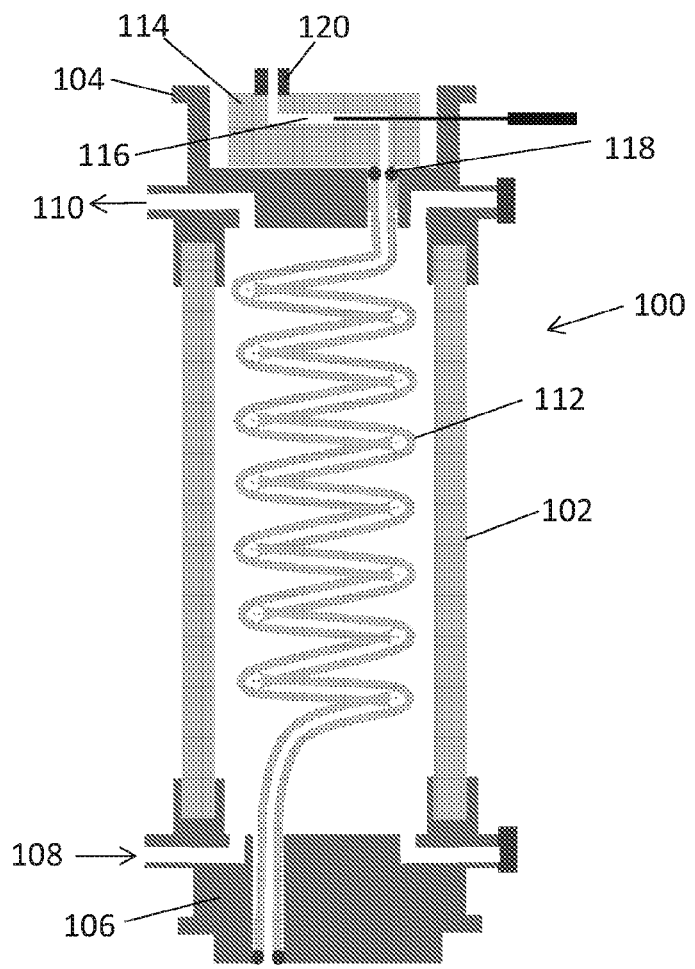
FIG. 1 is a schematic cross-section of a flow reactor in accordance with the prior art and the present invention.
Figure 2:
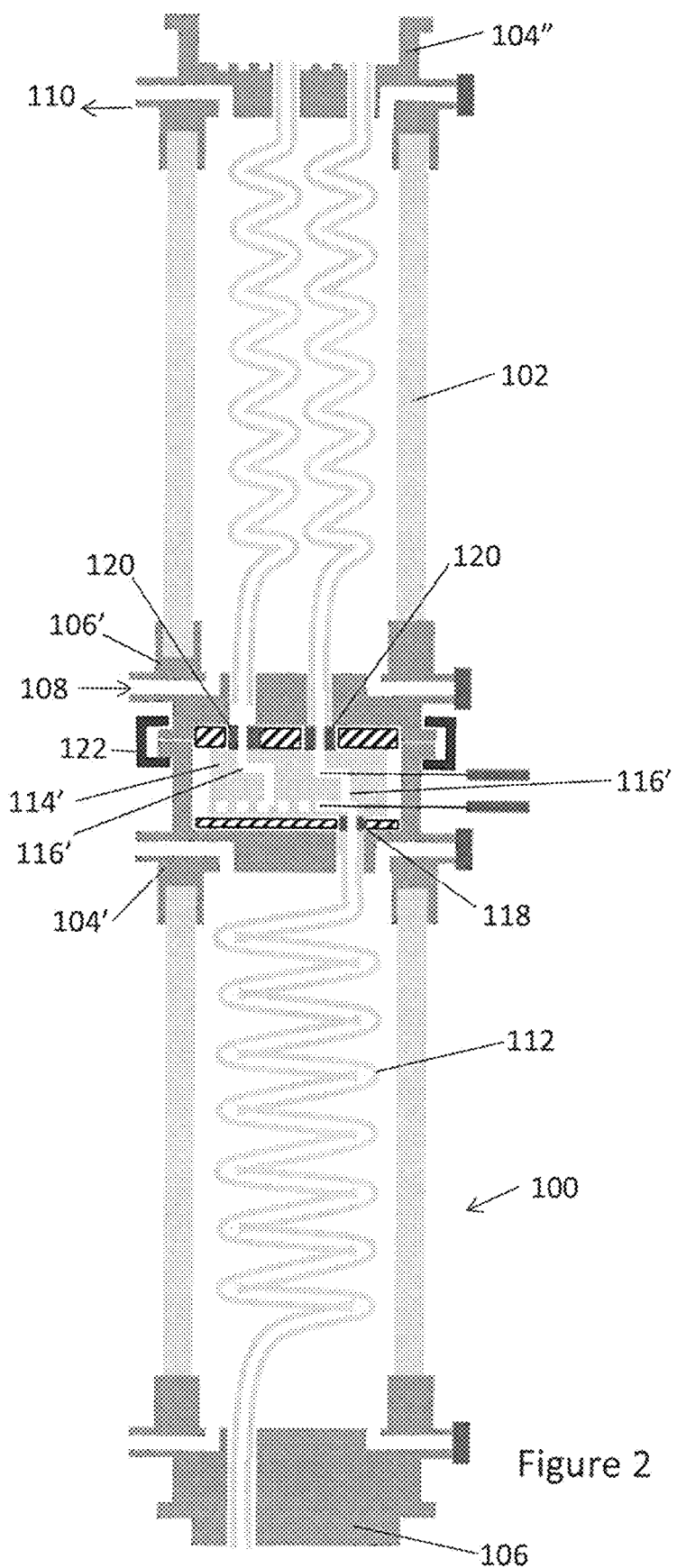
FIG. 2 is a similar view of a modular reactor in accordance with the prior art and the present invention.
Figures 3, 4:
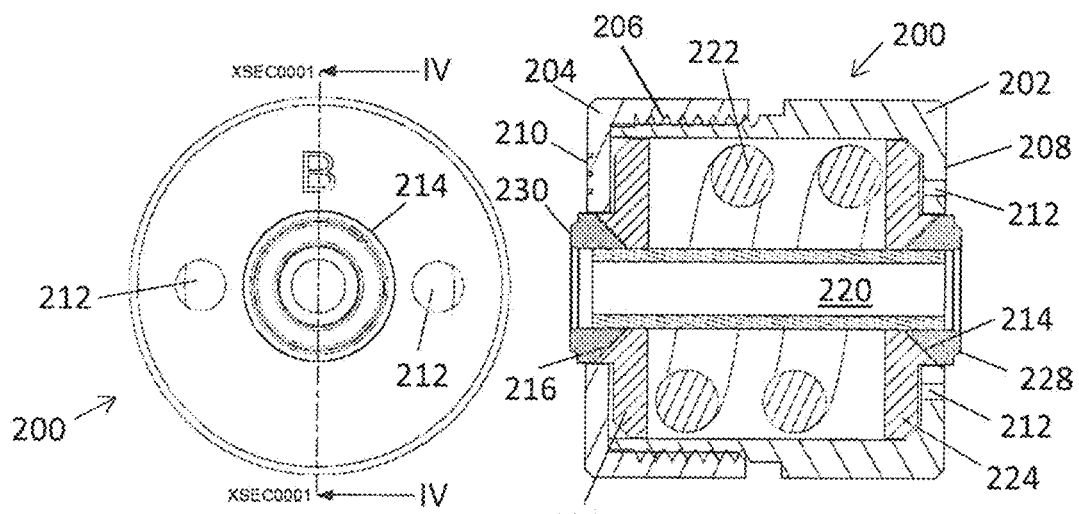
FIG. 3 is an end view of a seal assembly according to the present invention.
FIG. 4 is a cross-section through line IV-IV in FIG. 3.

Sealing assemblies of the present invention will be described below with reference to FIGS. 3 to 9. Any of these are suitable for use as the sprung seal 120 above in relation to FIGS. 1 and 2. The seal assembly is primarily designed for a reactor of the type described with reference to FIGS. 1 and 2. However, it can be used in any application where there is a desire to seal between first and second fluid ducts as described above.

A first example of a seal assembly is shown in FIGS. 3 to 7.

The assembly comprises a housing 200 which has a generally hollow cylindrical configuration. The housing comprises a base 202 and a cap 204 which are joined by a screw thread connection 206. The base 202 has a circular end wall 208 and the cap 204 has a corresponding circular end wall 210. The circular end wall 208 is provided with two through orifices 212 to prevent an air lock within the housing 200. These orifices 212 could equally or additionally be provided in the end wall 210 of the cap 204. Each of the end walls 208, 210 is provided with a central aperture 214, 216 having a frustoconical shape.

Within the housing 200 are the remaining components of the seal assembly. These include a glass tube 220 forming the fluid duct through the centre of the housing 200, a helical spring 222 which is positioned between end plates 224 and 226 which are forced against the end faces 208, 210 respectively by the helical spring 222. At each end of the housing 200 is a sealing element 228, 230 surrounding the end of the glass tube 220.

In order to assemble the seal assembly, the spring 222 and the end plates 224 and 226 are inserted into the base 202 and the end cap 204 is screwed in place. The glass tube 220 is then put into place and the two sealing elements 228 and 230 are pushed into position between the glass tube 220 and the respective end plates 224, 226 to form an interference fit. Alternatively, the glass tube 220 and sealing elements 228, 230 may be put in place before the end cap 204 is screwed into place.

Figure 5:
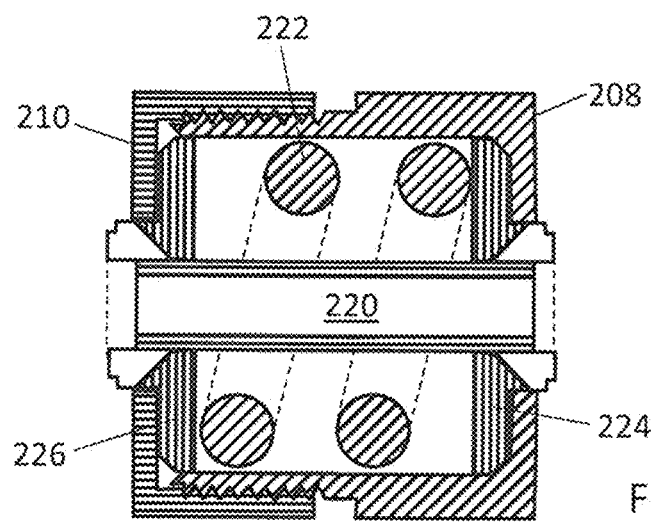
FIG. 5 is a view similar to FIG. 4 showing the components in an unstressed configuration.

The seal assembly in its uncompressed state is shown in FIG. 5. As shown here, the spring 222 urges the end plates 224, 226 against the respective end walls 208, 210.

Figure 6:
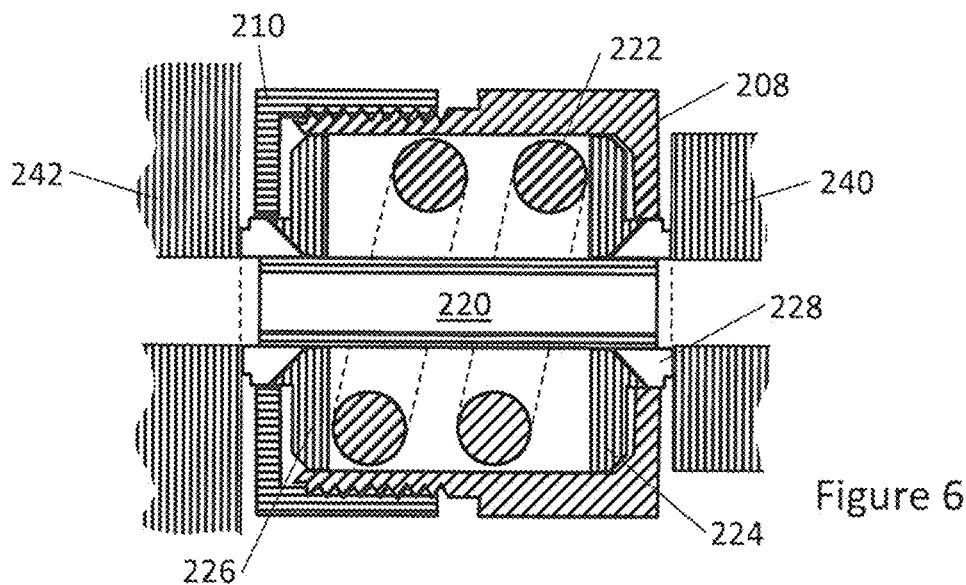
FIG. 6 is a view similar to FIG. 5 when clamped between the first and second fluid ducts.

When the seal assembly is in use between first fluid duct 240 and a second fluid duct 242, the ducts are brought together by a flange clamp 122 (FIG. 2) to the extent shown in FIG. 6 in which they compress the spring 222 thereby moving the end plates 224 and 226 away from the corresponding end walls 208, 210.

As these plates 224, 226 move away from their respective walls 208, 210, the sealing elements 228, 230 slide along the glass tube 220 whilst, at the same time, being compressed to a small extent. As can be seen in FIG. 6, the housing 200 does not contact the first 240 or second 242 fluid ducts. The only contact between the sealing assembly and the fluid ducts 240, 242 is via the sealing elements 228, 230.

Also apparent from FIG. 6 is the fact that the glass tube 220 provides a simple transition between the first 240 and second 242 fluid ducts with little or no dead space.

Figure 7:
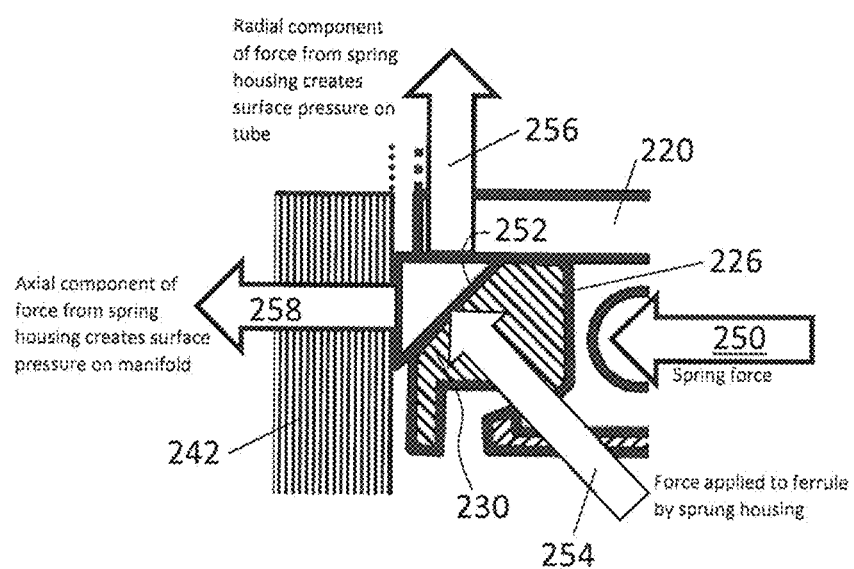
FIG. 7 is a schematic cross-section through a portion of the sealing element showing forces applied to the seal.

The operation of the seal is shown in greater detail in FIG. 7. This shows the detail of the lower portion of the sealing element 230. However, it will be appreciated that the description here also applies to the upper portion of this sealing element as well as the other sealing element 228. As shown in FIG. 7, in cross-section, the seal has a generally right angled isosceles triangle shape. In practice, it may have the more complex cross-section shown in FIGS. 4 to 6 in which there is an additional annular projection extending towards the second fluid duct 242.

As shown in FIG. 7, the spring 22 generates an axial spring force 250 on the end plate 226. This engages with an inclined face 252 of the sealing element 230 inclined at an angle of approximately 45° with respect to the axis X of the glass tube 220. The plate 226 applies a component 254 of the spring force to a radial component 256 which forces the seal 230 against the glass tube 220 and an axial component 258 which presses the seal 230 against the second fluid device 242.

As is apparent from FIG. 7, most of the perimeter of the sealing element 230 is constrained by surfaces so that there is very limited ability for the element 232 to undergo creep even at relatively high temperatures. There will inevitably be some unconstrained surfaces to allow for the clearance between the second fluid device 242 and the housing 200. Given the smallness of the surfaces where creep can occur, this does not unduly affect the lifetime of the seal.

EXAMPLE

In the flow reactor the manifold 114 the end caps 104, 106 are typically operated between −40° C. and 250° C. giving a range of 290° C. The manifold which is typically glass has a lower coefficient of thermal expansion ($4\times10^{-6}$/K) compared with the end cap which is typically stainless steel ($16\times10^{-6}$/K). The result is that the stainless steel expands and contracts to a greater extent than the glass over the 290° C. range. Given that the thickness of the glass manifold is 50 mm, then the difference in thermal expansion between the glass manifold and the stainless steel endcaps is:

$$50 \text{ mm} \times (16\times10^{-6}/K - 4\times10^{-6}/K) \times 290K = 0.17 \text{ mm}$$

In order to maintain a fluidic seal the expansion and contraction must be absorbed by the sealing assembly. This also takes up some of the tolerances in the assembly. For example, the manifold 114 typically has a thickness tolerance of +/−0.2 mm which is determined by the manufacturing process. The sealing assembly also absorbs this tolerance along with fabrication tolerances in the stainless steel endcaps 104, 106.

When the housing cap 204 is assembled with the housing base 202 the spring 222 is compressed so that the force in the spring is 100-1000 N. This is a typical force for the reactor of FIGS. 1 and 2 and would need to be scaled up for a larger seal.

In this example the compression force on the spring 222 will be ~400 N. The surface area of the sealing element that comes into contact with the fluid duct 240, 242 or glass pipe is around 40 mm². This results in a surface pressure of 10 MPa (100 Bar). This pressure indicates the operating pressure of the sealing element, although a safety factor is normally used so the actual operating pressure may be 25-50 Bar.

The 10 MPa stress that the sealing element experiences results in around 3% strain (based on a Young's Modulus of the material of 350 MPa). As a result the seal is compressed and the internal surface of the seal is pressed onto the outer surface of the glass tube 220. This results in a surface pressure on the glass tube which results in a seal between the ferrule and the glass tube.

The angle on the ferrule can be adjusted to reduce or increase the surface pressure on the inside surface of the seal. It is typically set to around 45° which ensures that the surface pressure on the inside surface of the seal is approximately equal to the surface pressure on the face of the seal.

The maximum sealing pressure of the sealing assembly is approximately equal to the surface pressure of the sealing element, which is directly related to the compression force in the spring. By pre-compressing the spring 222 it is possible to ensure that there is enough spare spring force available across the range of movement of the seal.

For example the spring 222 may typically be compressed by 3 mm giving a spring force of 300 N. When the seal assembly is clamped between the fluid ducts 240, 242 it is compressed by a further 1 mm resulting in a force of 400 N. During normal operation the length of the sealing assembly may vary by +/−0.5 mm as a result of thermal expansion/contraction and manufacturing tolerances. This results in a level of compression of 4 mm+/−0.5 mm which equates in a spring force of 400 N+/−50 N. This force range equates to a surface pressure of 100 Bar+/−12.5 Bar which is arranged to exceed the operating pressure range of the seal (25-50 Bar).

Figure 8:
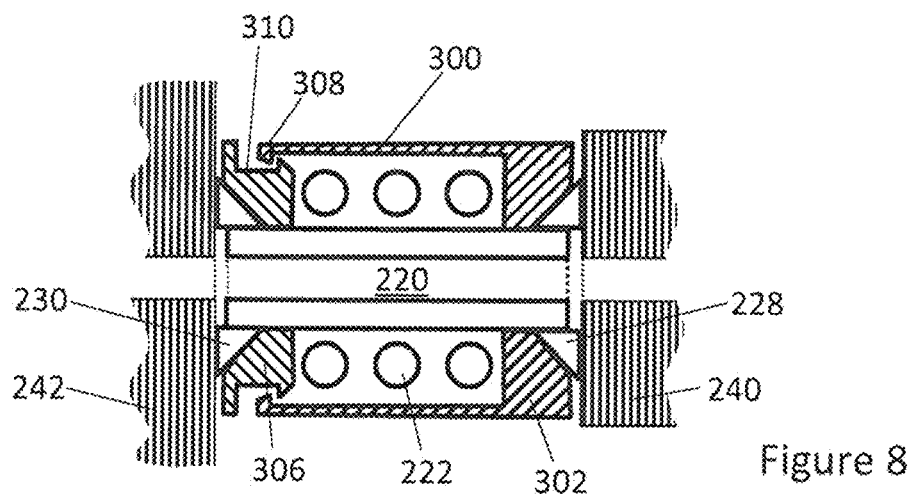
FIG. 8 is a view similar to FIG. 6 showing a second example of a sealing assembly.

A second example of a seal assembly is shown in FIG. 8. This example has the glass tube 220, the spring 222, the sealing elements 228, 230 and the ducts 240, 242 are as previously described. The previously described housing 200 and end plates 224, 226 have been modified. In particular, there are no separate end plates. Instead, the housing 300 is a base 302 with a cap 306 press fitted into the base 302, the lip 308 on the base 302 engages in a groove 310, cap 306. Lip 308 is free to slide within the base 310 but, as before, the spring 222 can exert a biasing force on the sealing element 228 and 230.

Figure 9:
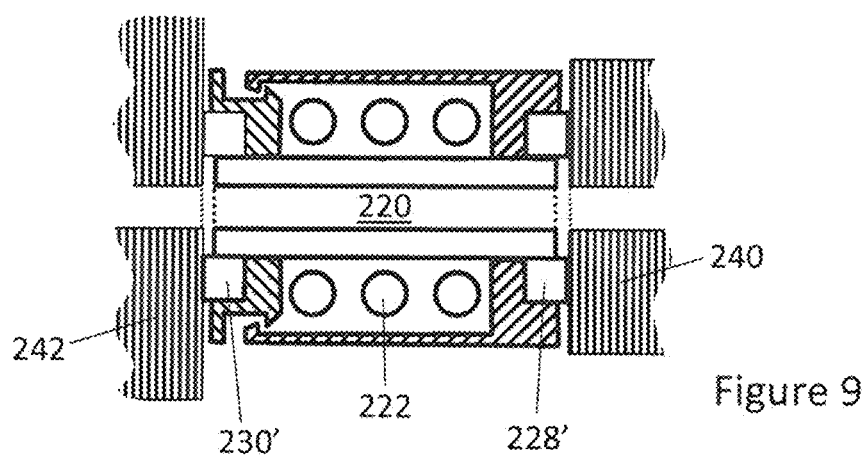
FIG. 9 is a view similar to FIGS. 6 and 8 showing a third example of the sealing assembly.

A third example is shown in FIG. 9. This modification is based on FIG. 8, but the same modification can also be applied to the first example of FIGS. 3 to 7. Thus, the elements 228' and 230' have a square cross-section. In this case, the force applied by the spring 122 will compress the sealing elements 228', 230'. The deformation caused by this compression will set the sealing elements. This shape of seal is therefore more applicable to softer seal materials. However, the sealing element is still largely constrained around its perimeter.

As a further alternative, each sealing member could be an O-ring, but this is harder to constrain in the same manner.

In a further modification, the spring 222 may be replaced by a form of biasing means such as disc springs, it may alternatively be a number of elements spaced around the tube 220, such as resilient rods or smaller springs.

The invention claimed is:

1. A sealing assembly creating a sealed flow path between first and second fluid ducts, the sealing assembly having a first end facing the first fluid duct and a second end facing the second fluid duct;
   a housing;
   a tube having an axis and being within the housing providing a fluid conduit between the fluid ducts;
   a first sealing element at the first end having an internal sealing face slidably engaged with and slidable with respect to the tube and an external face substantially perpendicular to the axis of the tube for sealing, in use, with the first fluid duct;
   a second sealing element at the second end having an internal sealing face slidably engaged with and slidable with respect to the tube and an external face substantially perpendicular to the axis of the tube for sealing, in use, with the second fluid duct;
   a first support slidably retained by the housing and surrounding one end of the tube and supporting one of the first and second sealing elements on a side of the one of the first and second sealing elements opposite to its external face; and
   a resilient element within the housing biasing the support so as to urge the first and second sealing elements apart.

2. The sealing assembly according to claim 1, further comprising a second support surrounding an opposite end of the tube and supporting the other one of the first and second sealing elements on a side opposite to the external face of the other one of the first and second sealing elements, the resilient element being arranged to bias the first and second supports apart.

3. The sealing assembly according to claim 1, wherein each of the first and second sealing elements is configured such that when, in use, its external face is sealed against a respective one of the first and second fluid ducts, at least 60% of a perimeter of the seal is constrained directly by the one of the first and second fluid ducts, the housing, the first support and tube.

4. The sealing assembly according to claim 1, wherein, in cross-section, an angle of interface between the seal and the first support with respect to an axis of the tube is between 30° and 60°.

5. The sealing assembly according to claim 1, wherein the tube comprises glass.

6. The sealing assembly according to claim 1, wherein the first and second sealing elements have a Young's Modulus of greater than 0.1 GPa.

7. The sealing assembly according to claim 6, wherein the first and second sealing elements have a Young's Modulus of between 0.2 GPa and 20 GPa.

8. The sealing assembly according to claim 1, wherein the first and second sealing elements are formed from a material selected from the group consisting of PFA, FEP, modified PTFE, and PEEK.

9. The sealing assembly according to claim 1, wherein the resilient element is a single compression spring.

10. The sealing assembly according to claim 1, wherein the external face of one or more of the first and second sealing elements has a raised annular portion.

11. The sealing assembly according to claim 1, wherein each of the first and second sealing elements is configured such that when, in use, its external face is sealed against a respective one of the first and second fluid ducts, at least 65% of a perimeter of the seal is constrained directly by the one of the first and second fluid ducts, the housing, the first support and tube.

12. The sealing assembly according to claim 1, wherein each of the first and second sealing elements is configured such that when, in use, its external face is sealed against a respective one of the first and second fluid ducts, at least 70% of a perimeter of the seal is constrained directly by the one of the first and second fluid ducts, the housing, the first support and tube.

13. A sealing assembly creating a sealed flow path between first and second fluid ducts, the sealing assembly having a first end facing the first fluid duct and a second end facing the second fluid duct;
  a housing;
  a tube within the housing providing a fluid conduit between the fluid ducts;
  a first sealing element at the first end having an internal sealing face slidably engaged with and slidable with respect to the tube and an external face for sealing, in use, with the first fluid duct;
  a second sealing element at the second end having an internal sealing face slidably engaged with and slidable with respect to the tube and an external face for sealing, in use, with the second fluid duct;
  wherein the tube does not protrude outwardly beyond the first and second sealing elements;
  a first support slidably retained by the housing and surrounding one end of the tube and supporting one of the first and second sealing elements on a side of the one of the first and second sealing elements opposite to its external face; and
  a resilient element within the housing biasing the support so as to urge the first and second sealing elements apart.

* * * * *